United States Patent [19]

Razavi

[11] 4,063,881
[45] Dec. 20, 1977

[54] SYNTHETIC POLYAMIDE FIBRES COLORED WITH ACID AZOBENZENE DYESTUFFS, CONTAINING A N-ALKYL (OR SUBSTITUTED ALKYL)-N-SULPHOPHENOXYALKYLAMINO RADICAL IN THE PARA POSITION TO THE AZO LINKAGE

[75] Inventor: Djavad Razavi, Paris, France

[73] Assignee: Produits Chimiques Ugine Kuhlmann, Clichy, France

[21] Appl. No.: 525,608

[22] Filed: Nov. 20, 1974

Related U.S. Application Data

[62] Division of Ser. No. 280,310, Aug. 14, 1972, abandoned, which is a division of Ser. No. 18,340, March 10, 1970, abandoned.

[30] Foreign Application Priority Data

Mar. 14, 1969  France .................................. 69.07258

[51] Int. Cl.$^2$ ..................... C09B 29/08; C09B 31/04; D06P 1/04; D06P 3/24
[52] U.S. Cl. ................................... 8/41 B; 260/157; 260/158; 260/186; 260/205; 260/207.5; 260/509
[58] Field of Search ............ 260/205, 206, 207, 207.1; 8/41 B

[56] References Cited

U.S. PATENT DOCUMENTS

| | | | |
|---|---|---|---|
| 2,398,367 | 4/1946 | Felix et al. | 260/207 |
| 2,603,656 | 7/1952 | Martin | 260/509 |
| 2,603,657 | 7/1952 | Vinton | 260/205 |
| 3,117,956 | 1/1964 | Lange et al. | 260/152 |
| 3,579,497 | 5/1971 | Ramanathan et al. | 260/158 |
| 3,709,870 | 1/1973 | Wolfrum | 260/186 |
| 3,709,872 | 1/1973 | Koller | 260/207.1 |
| 3,853,841 | 12/1974 | Desai et al. | 260/207.1 |

Primary Examiner—Floyd D. Higel
Attorney, Agent, or Firm—Beveridge, DeGrandi, Kline & Lunsford

[57] ABSTRACT

Polyamide fibres are colored with dyestuffs of the formula:

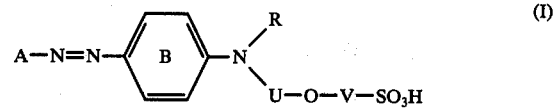

(I)

wherein A represents the residue of a carbocyclic diazotisable amine, R represents an alkyl group, U represents a linear or branched alkylene group of 1 to 5 carbon atoms, V represents an arylene group, and A, B, R and V are unsubstituted or substituted with non-water-solubilizing substituents, and a process for their preparation which comprises diazotising an amine of the formula:

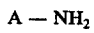

and coupling the diazo derivative thus obtained with a coupling component of the formula:

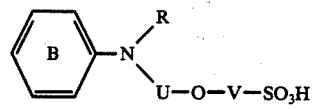

wherein A, B, R, U and V have the same significance as above. The polyamide fibres exhibit excellent tinctorial yield, very remarkable brilliance, good fastness to washing and to light and good covering of bars.

4 Claims, No Drawings

SYNTHETIC POLYAMIDE FIBRES COLORED WITH ACID AZOBENZENE DYESTUFFS, CONTAINING A N-ALKYL (OR SUBSTITUTED ALKYL)-N-SULPHOPHENOXYALKYLAMINO RADICAL IN THE PARA POSITION TO THE AZO LINKAGE

This is a division of application Ser. No. 280,310, filed Aug. 14, 1972, now abandoned, which in turn is a division of application Ser. No. 18,340, filed Mar. 10, 1970, now abandoned, both of which are relied upon and the entire disclosures and specifications of which are hereby incorporated by reference.

The present invention relates to polyamide fibres colored with water-soluble azo dyes.

The acid azo dyes selected at present for the dyeing of polyamide fabrics do not fulfill all the requirements of the dyer, which are: covering of bars, high tinctorial yield, brilliance and generally good fastness.

According to the present invention polyamide fibres are colored by means of a dyestuff acid azo dyes of general formula:

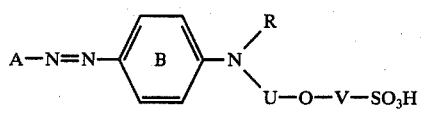
(I)

wherein A represents the residue of a carbocyclic or heterocyclic diazotizable amine, R represents an alkyl group preferably containing 1 to 4 carbon atoms, U represents a linear or branched alkylene group of 1 to 5 carbon atoms, V represents an arylene group and A,B,R and V possibly carry non-water-solubilizing substituents.

Most acid azo dyes of general formula (I), thanks to their plastosolubility, have a very good affinity for polyamides, excellent tinctorial yield, remarkable brilliance, good fastness to washing and to light and finally good covering of bars.

A may be substituted for example by at least one halogen atom or $-CF_3$, $-CCl_3$, alkyl, aralkyl, aryl, alkoxy, aryloxy, $-NO_2$, $-CN$, sulphonyl, sulphonamido, N-substituted sulphonamido, alkylthio, arylthio, carbonamido, N-substituted carbonamido, arylazo, $-COOR'$ ($R'$ representing an alkyl, aralkyl, cycloalkyl or aryl group) group. The nucleus B may be substituted for example by at least one halogen atom or alkyl, alkoxy, $-CF_3$, $-CCl_3$ or acylamino group. R may be substituted by for example one halogen atom or alkoxy, $-CN$ or alcoholic OH group. V may belong for example to the benzenic or napthalenic series and may be substituted for example by at least one halogen atom or alkyl group. The alkyl, alkoxy or alkylthio groups preferably contain 1 to 4 carbon atoms.

The dyes of formula (I) may be prepared for example by diazotizing an amine of formula $A-NH_2$ and coupling the diazo derivative in acid or buffered medium with a coupling component of the general formula

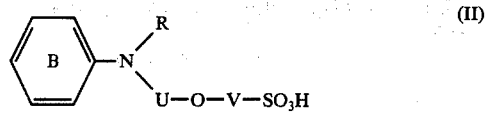
(II)

wherein A,B,R,U and V have the same significance as above.

Some of these coupling components are already known and are mentioned as intermediate compounds in the preparation of photographic developers in U.S. Pat. No. 2,603,656. Others are new and may be obtained for example by condensation of an amine of the general formula:

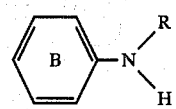

with a halogeno-alkyl arylether and sulphonation of the condensation product obtained.

In the following Examples which are purely illustrative the parts indicated are by weight unless otherwise stated.

EXAMPLE 1

13 parts of p-chloraniline dissolved in 100 parts of water and 25 parts of hydrochloric acid are diazotized by means of 7 parts of sodium nitrite at 0° C. and coupled at 0°-5° C. with 34.5 parts of the sodium salt of N-ethyl N-(2'-p-sulphophenoxy-ethyl) aniline dissolved in 200 parts of water and 10 parts of concentrated hydrochloric acid. After one hour of stirring at 0°-5° C. the pH is adjusted to approximately 3 by means of sodium acetate, the mixture is stirred overnight at ordinary room temperature, heated to 50° C. for a quarter of an hour, cooled to ordinary room temperature, filtered and dried at 50° C. 50 parts of a brown-red powder are obtained which dyes "Nylon" fibres in a yellow-gold shade which is fast to light and washing.

EXAMPLE 2

13 parts of p-chloraniline are diazotized as in Example 1 and coupled with 36 parts of the sodium salt of N-ethyl N-(2'-p-sulphophenoxy-ethyl) m-toluidine dissolved in 150 parts of water and 10 parts concentrated hydrochloric acid. The coupling of the dye is completed as in Example 1 and, after drying of the dye, a brown-red powder is obtained which dyes "Nylon" in a golden-yellow shade, which is slightly more orange than that of Example 1 and also fast to light and to washing.

The sodium salt of N-ethyl N-(2'-p-sulphophenoxy-ethyl) m-toluidine used for the manufacture of this dye may be prepared by the following process:

A mixture of 453 parts of the p'-bromoethyl ether of phenol and 608 parts of N-(monoethyl)m-toluidine is heated over one hour and a half to 95° – 100° C., then over 7 hours to 115° C. to 120° C. and then a solution of 110 parts of sodium hydroxide dissolved in 225 parts of water is added; the mixture is decanted and the upper layer is separated. This is distilled in vacuum and the excess ethyl m-toluidine is recovered followed by N-ethyl N-(2'-phenoxy ethyl) m-toluidine which distils in a vacuum of 1.5 mm of Hg at 172° – 173° C. (uncorrected). 531 parts of this product are obtained which solidifies after cooling. For the sulphonation 196 parts of the amine so prepared are added at between 50° C. and 60° C. to 174 parts by volume of 66° Be sulphuric acid. This mixture is then heated to 90° C., maintained for half an hour at that temperature, poured into 2000 parts of water, neutralized with approximately 540 parts by volume of a 40% solution of sodium hydroxide, cooled to 30° C. and precipitated by the addition of 700 parts of sodium chloride. The solid is filtered at that temperature, washed with a solution of 30% sodium chloride and dried at 50° C. A white powder is obtained which contains a little sodium chloride.

EXAMPLE 3

65 parts by volume of 66° Be sulphuric acid are added to a suspension of 27.5 parts of 6-ethoxy-2-amino-benzothiazole 91.4% in 80 parts of water. The mixture is cooled down to 0° C. and in 30 minutes 25 parts by volume of 2N sodium nitrite are added. Stirring is kept up for one and a half hours at between 0° C and 5° C. one part of sulphamic acid is added and then gradually 25 parts of the sodium salt of N-ethyl N-(2'-p-sulphophenoxy ethyl)m-toluidine prepared as in Example 2. Stirring is continued for one hour at 0° C. then overnight at ordinary room temperature. The mixture is poured onto ice-water, stirred for one hour, the pH is adjusted to 8 by means of sodium hydroxide solution, filtered and dried at 50° C. 30 parts of a violet powder are obtained which dyes polyamide fabrics such as "Nylon" fabric in a red shade which is fast to washing and to light.

The following Table summarizes other Examples of dyestuffs employed in the present invention prepared as in the previous Examples by diazotization of the A—NH$_2$ amine indicated in the second column and coupling of the diazo derivative with a coupling component of the formula:

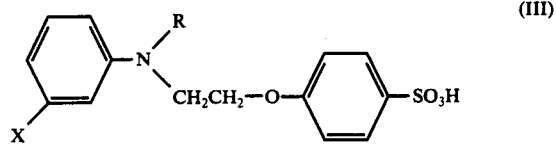

(III)

wherein X and R have the significances indicated in the third and fourth columns.

| Ex. | A—NH2 | X | R | Shade on "Nylon" |
|---|---|---|---|---|
| 4 | p-chloraniline | H | methyl | golden yellow |
| 5 | o-chloraniline | H | ethyl | " |
| 6 | " | " | methyl | " |
| 7 | " | methyl | ethyl | orange-yellow |
| 8 | 5-chloro-2-methoxy-aniline | H | " | " |
| 9 | " | methyl | " | " |
| 10 | 3-amino-1,2,4-triazole | H | " | yellow |
| 11 | " | methyl | " | orange-yellow |
| 12 | 4-amino-azobenzene | H | ethyl | scarlet |
| 13 | " | " | methyl | scarlet |
| 14 | " | methyl | ethyl | scarlet red |
| 15 | 4-amino-3,2'-dimethyl azobenzene | H | ethyl | scarlet red |
| 16 | " | methyl | " | " |
| 17 | p-nitraniline | H | " | " |
| 18 | " | H | Methyl | " |
| 19 | 2-amino-benzothiazole | H | ethyl | red |
| 20 | " | methyl | " | bluish red |
| 21 | 2-amino-6-ethoxy-benzothiazole | H | " | " |
| 22 | " | " | methyl | " |
| 23 | 2-bromo-4,6-dinitro-aniline | methyl | ethyl | bluish violet |

-continued

| Ex. | A—NH2 | X | R | Shade on "Nylon" |
|---|---|---|---|---|
| 24 | 2-amino-4-nitro-thiazole | " | " | reddish blue |
| 25 | 4-amino-2',6'-dichloro-2,5-dimethoxy-4'-nitro azobenzene | " | " | navyblue |
| 26 | o-toluidine | " | " | yellow |
| 27 | p-toluidine | " | " | " |
| 28 | o-anisidine | " | " | " |
| 29 | p-anisidine | " | " | " |

EXAMPLE 30

13 parts of p-chloraniline are diazotised by means of 25 parts of hydrochloric acid and 7 parts of sodium nitrite and coupled with 36 parts of the sodium salt of N-ethyl N(2'-p-sulphophenoxy-ethyl)o-toluidine, dissolved in 200 parts of water and 10 parts of concentrated hydrochloric acid. The coupling is completed as in Example 1 and a brown-red powder is obtained which dyes "Nylon" fabrics in a yellow shade.

The sodium salt of N-ethyl N-(2'-p-sulphophenoxy-ethyl)o-toluidine may be prepared by the following process: A mixture of 135 parts of N-(monoethyl)-o-toluidine and 100 parts of the β-bromoethyl ether of phenol is heated for 1 hour up to 120° C. and maintained at this temperature overnight. Then a solution of 24 parts of sodium hydroxide dissolved in 100 parts of water is added, the mixture is decanted and the upper layer is separated. This material is distilled under a vacuum of 1.5 mm of Hg and the fraction that distils between 162° C. and 172° C is collected. The sulphonation of the amine is effected as in Example 2 and a water-soluble white powder is obtained.

I claim:
1. Synthetic polyamide fibre colored with a water-soluble dyestuff of the formula:

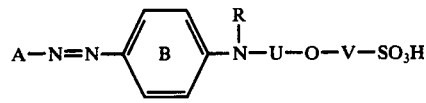

wherein A is phenyl substituted by 1 to 3 substituents selected from the group consisting of chlorine, bromine, methyl, methoxy, nitro, phenylazo, tolylazo, and 2,6-dichloro-4-nitrophenylazo, B is unsubstituted or substituted by methyl, R is alkyl containing 1 to 4 carbon atoms, U is alkylene containing 2 to 5 carbon atoms, V is unsubstituted phenylene or phenylene substituted by one chlorine, bromine or alkyl containing 1 to 4 carbon atoms.

2. A synthetic polyamide fibre colored with a dyestuff having the systematic name: 2-chloro-2'-methyl-4'-[N-ethyl-N-(2-p. sulphophenoxy-ethyl)amino] azobenzene.

3. A synthetic polyamide fibre colored with a dyestuff having the systematic name 2,2'-dimethyl-4'-[N-ethyl-N(2-p. sulphophenoxy-ethyl)amino] azobenzene.

4. A synthetic polyamide fibre colored with a dyestuff having the systematic name 4-chloro-2'-methyl-4'-[N-ethyl-N-(2-p. sulphophenoxy-ethyl)amino] azobenzene.

* * * * *